W. R. CRIPPEN.
MECHANISM FOR ACTUATING MUSIC ROLLS IN PNEUMATIC PLAYERS.
APPLICATION FILED JUNE 14, 1911.

1,025,126.

Patented May 7, 1912.
2 SHEETS—SHEET 1.

WITNESSES:

INVENTOR:

W. R. CRIPPEN.
MECHANISM FOR ACTUATING MUSIC ROLLS IN PNEUMATIC PLAYERS.
APPLICATION FILED JUNE 14, 1911.

1,025,126.

Patented May 7, 1912.
2 SHEETS—SHEET 2.

UNITED STATES PATENT OFFICE.

WALTER R. CRIPPEN, OF NEWTON, MASSACHUSETTS, ASSIGNOR TO VOSE & SONS PIANO COMPANY, OF BOSTON, MASSACHUSETTS, A CORPORATION OF MAINE.

MECHANISM FOR ACTUATING MUSIC-ROLLS IN PNEUMATIC PLAYERS.

1,025,126. Specification of Letters Patent. Patented May 7, 1912.

Application filed June 14, 1911. Serial No. 633,143.

*To all whom it may concern:*

Be it known that I, WALTER R. CRIPPEN, a citizen of the United States, and resident of Newton, in the county of Middlesex and State of Massachusetts, have invented new and useful Improvements in Mechanism for Actuating Music-Rolls in Pneumatic Players, of which the following is a specification.

This invention relates to pneumatic player mechanisms, and particularly to the transmission mechanism between the motor and the spool box for actuating the music rolls in piano players.

Figure 1:
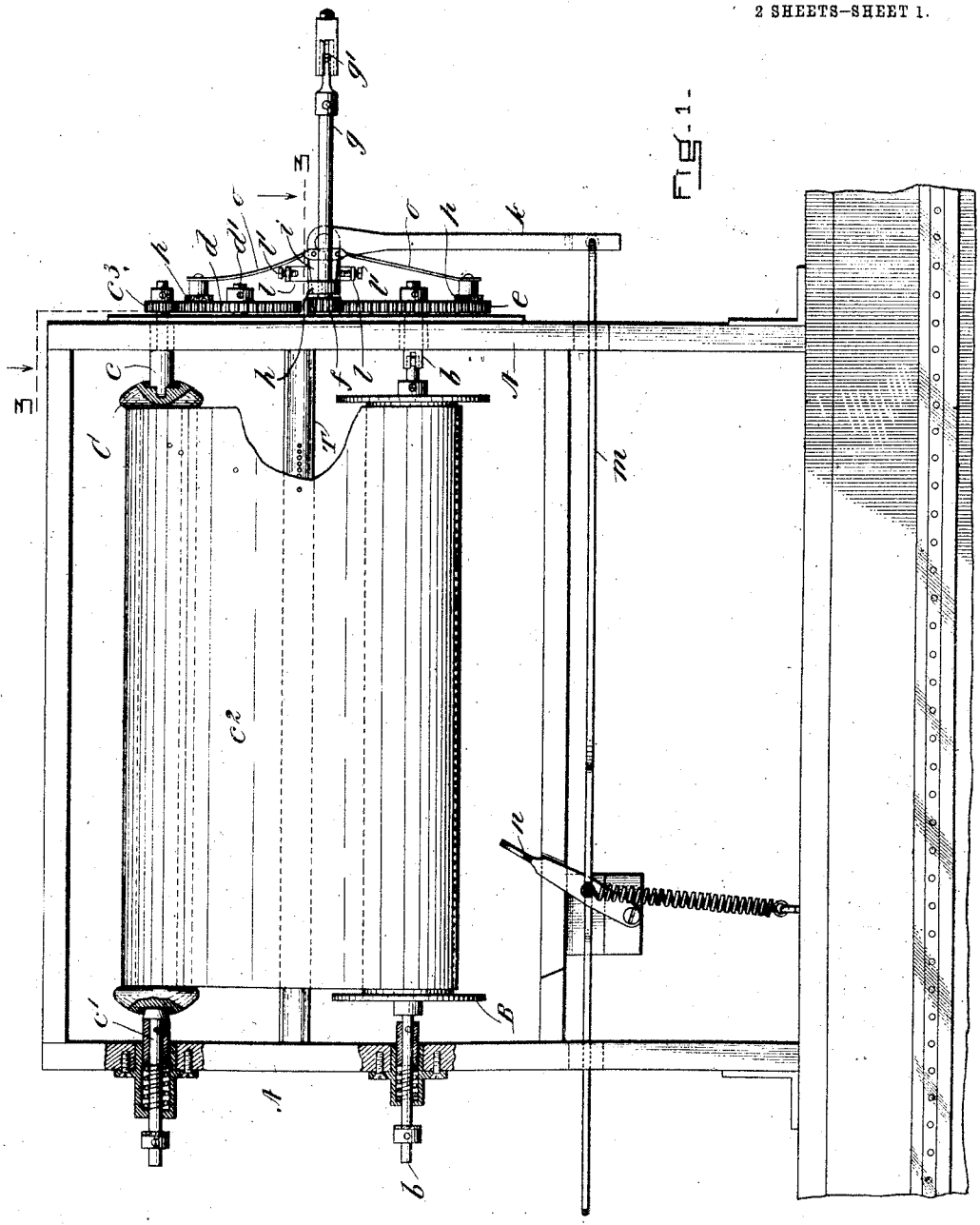
Figure 2:
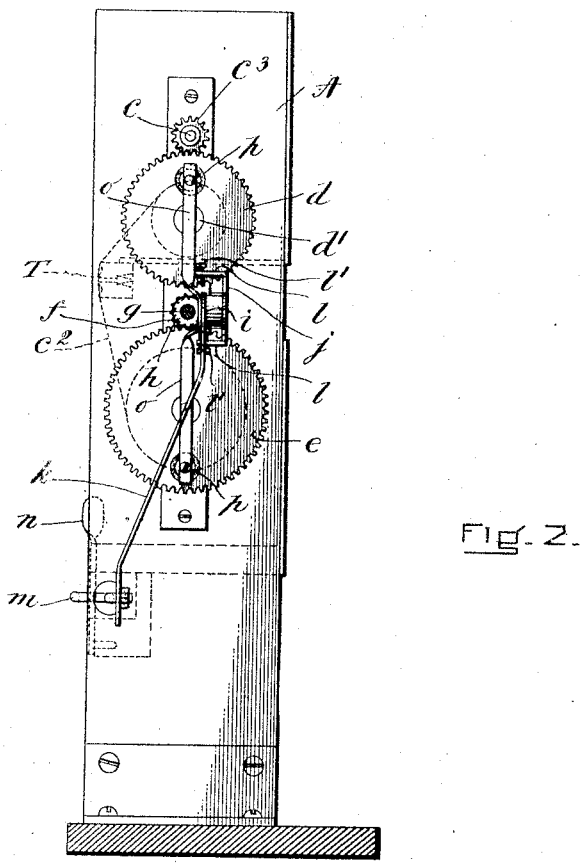
Figure 3:
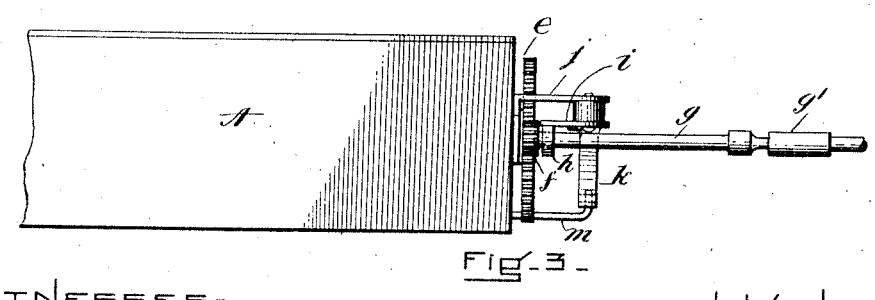

In the accompanying drawings which illustrate one embodiment of my invention,—Figure 1 is a front view of the spool box of a piano player, and of my improved transmission mechanism; Fig. 2 is a side view, taken from the right, of the mechanism shown in Fig. 2; and Fig. 3 is a top view on line 3—3 of Fig. 1.

The spool box is shown at A, and contains the receiving spool B carried by the receiving shaft $b$, and the music roll shafts or spindles $c$ and $c'$ which carry the music roll spool C. The perforated music sheet $c^2$ passes in the usual way from the spool C over the tracker bar T to the receiving spool B.

The shafts or spindles $b$ and $c$ are journaled in and extend through the end wall of the spool box A. A pinion $c^3$ is secured fast to spindle $c$ on the outer side of the spool box. In mesh with pinion $c^3$, is an intermediate gear $d$ for driving pinion $c^3$, journaled on a stud $d'$ on the outer wall of spool box A. The receiving spool shaft $b$ is provided with a driving gear $e$ on the outer side of the spool box for turning the receiving spool shaft $b$.

In the space between the intermediate gear $d$ and the gear $e$ is the driving pinion $f$, fixed to the driving shaft $g$. The shaft $g$ is provided with a universal joint $g'$, so that the pinion $f$ may be shifted into engagement with either the gear $d$ or the gear $e$, and out of engagement with the other. The shaft $g$ is connected with a motor (not shown) which may be of usual construction. The end of shaft $g$, near the pinion $f$, is supported by a collar or bearing $h$, which is carried by lever $i$. Lever $i$ is pivoted on a bracket $j$, secured to the spool box, and is actuated by the lever arm $k$. The bracket $j$ is made with two arms $l$, for holding set screws $l'$, which form adjustable stops to limit the movement of lever $i$, and consequently of pinion $f$.

The lever arm $k$ is actuated by a rod $m$, mounted to slide in the spool box, and the manually operated shifting lever $n$. When lever $n$ is thrown to the right, as shown in Fig. 1, driving pinion $f$ will be swung downward into mesh with gear $e$. The receiving spool B will then be rotated by the driving shaft to wind the music sheet $c^2$ from spool C on to spool B. When the music sheet is to be rewound on spool C, lever $n$ is shifted to the left, and pinion $f$ is thereby shifted out of mesh with gear $e$ and into mesh with gear $d$.

Fastened to lever $i$ are the spring arms $o$ each carrying at its end a pad $p$ of felt or other suitable material, to act as a brake when pressed against the driving gear. When the lever $i$ is swung downward to shift pinion $f$ into mesh with gear $e$, the upper brake $p$ will be yieldingly applied to gear $d$, and at the same time the pressure of the lower brake $p$ against gear $e$ will be relieved. This will permit the receiving shaft $b$ to be turned easily from the driving shaft, and the upper brake will prevent the spool C, which for the time being is turning idly, from spinning or unrolling the paper faster than it is taken up by the receiving spool B. Similarly, when lever $i$ is swung upward to shift pinion $f$ into mesh with gear $d$, the pressure of the upper brake $p$ against gear $d$ will be relieved, and the lower brake $p$ will be yieldingly applied to gear $e$.

I claim:

In a player mechanism, a receiving spool and a driving gear therefor, a music roll spindle and a driving gear therefor, a driving shaft, a pinion on said shaft adapted to actuate said gears one at a time, a shiftable bearing for said shaft, a pair of brakes adapted to coöperate alternately each with one of said gears, and a lever to shift said bearing, pinion and brakes, by which said pinion may be shifted into engagement with either one of said gears and the brake simultaneously applied to the other of said gears.

Signed by me at Boston, Massachusetts, this 5th day of June, 1911.

WALTER R. CRIPPEN.

Witnesses:
ROBERT CUSHMAN,
CHARLES D. WOODBERRY.